United States Patent [19]

Miyaji et al.

[11] Patent Number: 5,351,297
[45] Date of Patent: Sep. 27, 1994

[54] METHOD OF PRIVACY COMMUNICATION USING ELLIPTIC CURVES

[75] Inventors: Atsuko Miyaji, Kawachinagano; Makoto Tatebayashi, Takarazuka, both of Japan

[73] Assignee: Matsushita Electric Industrial Co., Ltd., Osaka, Japan

[21] Appl. No.: 48,478

[22] Filed: Apr. 16, 1993

Related U.S. Application Data

[63] Continuation-in-part of Ser. No. 904,944, Jun. 26, 1992, Pat. No. 5,272,755.

[30] Foreign Application Priority Data

Jun. 28, 1991 [JP] Japan .................................. 3-158205

[51] Int. Cl.$^5$ .............................................. H04K 1/00
[52] U.S. Cl. ............................................ 380/28; 380/30
[58] Field of Search ........................................ 380/30, 28

[56] References Cited

U.S. PATENT DOCUMENTS

| | | |
|---|---|---|
| 4,424,414 | 1/1984 | Hellman et al. . |
| 4,495,082 | 1/1985 | Mita et al. . |
| 4,668,103 | 5/1987 | Wilson . |
| 4,995,082 | 2/1991 | Schnorr ........................ 380/30 |
| 5,010,573 | 4/1991 | Musyck et al. . |
| 5,054,066 | 10/1991 | Rick et al. ..................... 380/30 |
| 5,146,500 | 9/1992 | Maurer . |
| 5,150,411 | 9/1992 | Maurer . |
| 5,159,632 | 10/1992 | Crandall ........................ 380/30 |
| 5,199,070 | 3/1993 | Matsuzaki et al. .............. 380/30 |

FOREIGN PATENT DOCUMENTS

| | | |
|---|---|---|
| 59-107658 | 6/1984 | Japan . |
| 63-52536 | 3/1988 | Japan . |
| 1119144 | 5/1989 | Japan . |
| 3505033 | 10/1991 | Japan . |

OTHER PUBLICATIONS

Primality and Cryptography, E. Kranakis (John Wiley & Sons, Chichester, 1986) pp. 141-169.

Primary Examiner—David C. Cain
Attorney, Agent, or Firm—Price, Gess & Ubell

[57] ABSTRACT

The present invention provides a method of privacy communication, in which an elliptic curve E and an element thereof are notified to all parties who wish to communicate, and data are transmitted from one party to another by using a calculation of the element and coded data made in secret by each party. The method is characterized by a construction of E(GF(p)) such whose number of elements has exactly p, assuming that p is a prime number and E(GF(p)) is a group of elements of GF(p) on the elliptic curve E. More particularly, E(GF(p)) is constructed by an algorithm: let d be a positive integer such that gives an imaginary quadratic field $Q((-d^{\frac{1}{2}}))$ with a small class number; then find a prime number p such that $4 \cdot p - 1 = d \cdot$square number; and find a solution of a class polynomial $H_d(x) = 0$ modulo p such that is defined by d and given with a j-invariant.

12 Claims, 6 Drawing Sheets

Fig. 4

| Step | Items | Parties | Particulars |
|---|---|---|---|
| 1 | Initial Setting | Network Provider Z | Selects $E(GF(q))$ $q = p^r$, $p$ is a prime number. Selects $P$ |
| 2 | Notice (Elliptic Curve) | Network Provider Z | Notifies all the users of $E(GF(q))$ and $P$ |
| 3 | Selection | All Users | Selects a secret key $x$ (User B selects $x_B$) |
| 4 | Calculation | Each User | Caluculates a public key $Y$ (User B gets $Y_B = x_B \cdot P$ |
| 5 | Notice (Public key) | Each User | Notifies his public key to User A |
| 6 | Privacy Communication (ciphered information) | User A | Generates a random number $r_a$ Enciphers a message $M$ $C_1 = r_a P$ $C_2 = M + r_a \cdot Y_B$ Transmits $C_1$ and $C_2$ to User B |
| 7 | Deciphering | User B | Deciphers the ciphered message $M = C_2 - x_B \cdot C_1$ |

Fig. 7

(P-1) $\{d=19$ (P-2) $\begin{cases} i=1 \\ P=5\{=(19\cdot 1^2+1)/4\} \end{cases}$ (P-3) $\{a=1$ (P-4, P-5) $\{C=2$ A square non-residue element of GF(5)

(P-6) $\begin{cases} E : y^2 = x^3+3\cdot 1x+2\cdot 1 = x^3+3x+2 \qquad (\equiv \bmod 5) \\ E_1: y^2 = x^3+3\cdot 1 \cdot 2^2 x+2\cdot 1\cdot 2^3 = x^3+2x+1 \quad (\equiv \bmod 5) \\ E(GF(5))=(1,\pm 1)(2,\pm 1), \text{ infinite point } \#E(GF(5))=5 \\ E_1(GF(5))=(0,\pm 1),(1,\pm 2),(3,\pm 2) \text{ infinite point} \\ \#E_1(GF(5))=7. \end{cases}$ (P-7) $\begin{cases} E(GF(5)) \ni G=(1,1) \\ 5G=0 \\ \text{The Elliptic Curve E has 5 elements} \end{cases}$

METHOD OF PRIVACY COMMUNICATION USING ELLIPTIC CURVES

This is a continuation-in-part application of U.S. Ser. No. 07/904,944, filed on Jul. 26, 1992, for a PUBLIC KEY CRYPTOSYSTEM WITH AN ELLIPTIC CURVE now U.S. Pat. No. 5,272,755, issued Dec. 21, 1993.

BACKGROUND OF THE INVENTION (1) Field of the Invention

The present invention relates to a privacy communication technique to provide security for information transmission, and more particularly, to a privacy communication technique using elliptic curves.

(2) Description of Related Art

Privacy communication enables a sender to transmit information to an intended receiver alone without leakage to third parties, and a public key cryptosystem(PKC) is one of the methods thereof via a public digital communication network. In PKC, two keys—an enciphering key and a deciphering key—are given to each party; the former is open to the public while the latter is kept in secret. Given that it is relatively easy to manage these public keys, PKC has now become an essential technique when one wishes to communicate with more than one party in secret.

The security for PKC often depends on difficulty of a discrete logarithm problem(DLP) on finite abelian groups, and finite fields have been used as the finite abelian groups. However, owing to a toil of researchers, the time required to solve DLP has been reduced with every advancement they make. The history of such advancement is compiled in "Cryptography: A Prime", Alan G. Konheim, John Wiley & Sons, Inc. Accordingly, a method that uses elliptic curves in place of the finite abelian groups was proposed to maintain the security for PKC against is advancement. This proposed method is described in "A Course in Number Theory and Cryptography", Neal Koblits, Springer-Verlag, 1987, and the DLP on elliptic curves(EDLP) reads:

Let q be a power of a prime number, GF(q) be a finite field, E(GF(g)) be a group of elements of GF(q) on an elliptic curve E, and an element P of E(GF(q)) be a base point, find an integer x such that $Q=xP$ (Q is a given element of E(GF(q)), if such an integer x exists.

The researchers correspondingly began to apply this EDLP to the methods of the privacy communication such as PKC, because if effectively applied, it was envisaged that 1) the speed of communication would be sharply increased without impairing the security, for there had been no solution proposed such that could confer a sub-exponential algorithm on EDLP,
2) the communication in volume would be reduced,
3) a greater number of the finite abelian groups would be available compared with the finite fields.

However, unlike the finite fields which define DLP, the researchers found it very difficult to construct appropriate elliptic curves which in effect define EDLP, and their interest has shifted to how easily one can construct them. Conventionally, the elliptic curves are constructed by the following method:

1) Method I

With this method, an elliptic curve called a supersingular elliptic curve is constructed. This method is described in "The Implementation of Elliptic Curve Cryptosystems", Alfred Menezes, Scott Vanstone, Auscrypt 90, 1990, and following is the recapitulation thereof. This method consists of 2 steps as is shown in FIG. 1.

(i) Determination of a Prospective Elliptic Curve

Let $E_1$, $E_2$, and $E_3$ be supersingular elliptic curves defined over GF(2) given by $$E_1: y^2 + y = x^3 + x + 1$$

$$E_2: y^2 + y = x^3 + x$$

$$E_3: y^2 + y = x^3$$

Let $E_i(GF(2^m))(i=1\text{-}3)$ be a group consisting of the elements of $GF(2^m)$ on each supersingular elliptic curve, then $$E_1(GF(2^m)) = \{x, y \in GF(2^m) | y^2 + y = x^3 + x + 1\} \cup \{\infty\}$$

$$E_2(GF(2^m)) = \{x, y \in GF(2^m) | y^2 + y = x^3 + x\} \cup \{\infty\}$$

$$E_3(GF(2^m)) = \{x, y \in GF(2^m) | y^2 + y = x^3\} \cup \{\infty\}$$

($\infty$ is an infinite point which is known as a zero element).

As can be seen in the above, the elements of $E_i(GF(2^m))$ constitute a finite abelian group; for addition is applied among themselves.

Further, let m be an odd number, then the number of $E_i(GF(2^m))(i=1\text{-}3)$, or $\#E_i(GF(2^m))$, is found as given below by Deu's theorem and Hasse's theorem.

$$\#E_1(GF(2^m)) = 2^m + 1 - 2^{(m+1)/2} \text{ in case } (m \equiv 1,7 (\bmod 8))$$
$$\text{or}$$
$$= 2^m + 1 + 2^{(m+1)/2} \text{ in case } (m \equiv 3,5 (\bmod 8))$$

$$\#E_2(GF(2^m)) = 2^m + 1 + 2^{(m+1)/2} \text{ in case } (m \equiv 1,7 (\bmod 8))$$
$$\text{or}$$
$$= 2^m + 1 - 2^{(m+1)/2} \text{ in case } (m \equiv 3,5 (\bmod 8))$$

$$\#E_3(GF(2^m)) = 2^m + 1$$

(ii) Determination of a Suitable Extension Degree m

It is known that EDLP is easily solved unless the order of the element P, or the base point, has a large prime factor. Therefore, a necessary and sufficient condition for the element P is that $\#E_i(GF(2))$ has a large prime factor. Thus, m such that satisfies the necessary and sufficient condition is found.

The elliptic curves found in Step (i) and m in Step (ii) are used to construct EDLP. Accordingly, $\#E_3(GF(2^m))$ factorized, and it is found that:

when m is 191, $$\#E_3(GF(2^m)) = 2^{191} + 1 = 3 \cdot p_1,$$

when m is 252, $$\#E_3(GF(2^m)) = 2^{251} + 1 = 3 \cdot 238451 \cdot p_2$$

($p_1$ and $p_2$ are prime numbers.)

This leads to a conclusion that EDLP can be constructed by finding a supersingular elliptic curve defined over $E_3(GF(2^{191}))$ with the base point P whose order has exactly $p_1$ or $E_3(GF(2^{251}))$ with the base point P whose order has exactly $p_2$. In other words, the enciphering and deciphering keys are made by using these $E^3(GF(2^{191}))$ and the base point P, or $E^3(GF(2^{251}))$ and the base point P.

In 1991, however, a solution using a reducing method was proposed. This method is effective in solving EDLP on supersingular elliptic curves, for it confers a sub-exponential algorithm thereon, thereby impairing security for privacy communication.

"Reducing Elliptic Curve Logarithm to Logarithms in a Finite Field", A. Menezes, S. Vanston, and T. Okamoto, STOC, '91, gives an explanation on the reducing method, and it reads:

Let q be a square of a prime number, E an elliptic curve defined over GF(q), E(GF(q)) be a group consisting of elements of GF(q) on the elliptic curve E. Then, EDLP on the elliptic curve having the base point P∈E(GF(q)) can be solved by reducing it to DLP over an extension field $GF(q^r)$ of GF(q), provided that the order of the base point P is prime to q. EDLP on supersingular elliptic curves, in particular, can be solved by reducing it to the sextic extension field of GF(q) -$GF(q^6)$- at most.

Attacked by this reducing method, EDLP constructed by Method I can no longer secure PKC unless n of $GF(2^n)$ is increased to a number larger than 256, which in turn causes a steep decrease of the communication speed.

Given these circumstances, another constructing method of EDLP which can secure PKC against this attack was proposed.

2) Method II

With this method, ordinary elliptic curves which defines EDLP unsolvable by the reducing method is constructed. This method is described in "Non-supersingular Elliptic Curve for Public Key Cryptosystems", T. Beth, F. Schaefer, Eurocrypt 91, 1991, and the following is the recapitulation thereof. This method consists of 2 steps as is shown in FIG. 2.

(i) Determination of a Prospective Elliptic Curve

Let $E_i$(i=4,5) be a non-supersingular, i.e. ordinary, elliptic curve defined over GF(2) given by $$E_4: y^2 + xy = x^3 + x^2 + 1$$

$$E_5: y^2 + xy = x^3 + 1$$

Let $E_i(GF(2^m))$ be a group consisting of the elements of $GF(2^m)$(i=4,5) on each elliptic curve, then the number thereof, or $\#E_i(GF(2^m))$, is found as given below by Deu's theorem and Hasse's theorem.

$$\#E_4(GF(2^m)) = 1 + 2^r - \{(1+(-7)^{\frac{1}{2}})/2\}^m - \{(1-(-7)^{\frac{1}{2}})/2\}^m$$

$$\#E_5(GF(2^m)) = 1 + 2^r - \{(-1+(-7)^{\frac{1}{2}})/2\}^m - \{(-1-(-7)^{\frac{1}{2}})/2\}^m$$

(ii) Determination of an Extension Degree m

Let m be an extension degree for $E_i$(i=4,5) such that it satisfies the two following conditions:

Condition 1:
  $\#E_i(GF(2^m))$ must have a large prime factor.
Condition 2:
  Let p be the largest prime factor of $\#E_i(GF(2^m))$, and t be a sufficiently large positive integer, then $2^{mk}-1$ does not have p as a prime factor(k is an arbitrary positive integer smaller than t).

Condition 1 is given to provide $\#E_i(GF(2^m))$ with a large prime factor and Condition 2 to increase t as far as possible, for the security increases as t becomes larger; more particularly, when EDLP on the elliptic curve defined over $E_i(GF(2^m))$ is reduced to DLP on the elliptic curve defined over the extension field of $GF(2^m)$, the extension degree m becomes larger than t.

The elliptic curves found in Step (i) and m in Step (ii) are used to construct EDLP. Accordingly, $\#E_4(GF(2^m))$ is factorized, and it is found that when m is 107, $\#E_4(GF(2^m)) = 2 \cdot p_3$($p_3$ is a prime number).

It is easy to calculate $2^{mk}-1$ with today's advanced computers, and to prove that $2^{mk}-1$ does not have $p_3$ as a prime factor when k is a number from 1 to 6. Thus, it can be concluded that an ordinary elliptic curve defined over $E_4(GF(2^{107}))$ with the base point P whose order has exactly $p_3$ must be found to construct EDLP, on which the security of PKC depends. In other words, the enciphering and deciphering keys are made by using these $E_4(GF(2^{107}))$ and the base point P.

PKC using such ordinary elliptic curves is secure when n of $GF(2^n)$ is a number more than 100 with the level of today's computer technology. Yet, such security can not be guaranteed without increasing n endlessly to meet rapid progress in this field, which in turn reduces the speed of privacy communication. Therefore, a method of constructing elliptic curves such that define EDLP unsolvable by the reducing method has been sought after.

SUMMARY OF THE INVENTION

Accordingly, the present invention has an object to provide a method of privacy communication using elliptic curves which define an EDLP unsolvable by the reducing method.

The above object is fulfilled by a method of privacy communication in which an elliptic curve E and an element thereof are notified to all parties who wish to communicate, and data are transmitted from one party to another by using a calculation of the element and coded data made in secret by each party, the method is characterized by a construction of E(GF(p)) whose number of elements has exactly p, assuming that p is a prime number and E(GF(p)) is a group of elements of GF(p) on the elliptic curve E. Further, E(GF(p)) is constructed by an algorithm : let d be a positive integer such that it gives an imaginary quadratic field $Q((-d^{\frac{1}{2}}))$ with a small class number; then find a prime number p such that $4 \cdot p - 1 = d \cdot$square number; and find a solution of a class polynomial $H_d(x) = 0$ modulo p such that is defined by d and given with a j-invariant. The elliptic curve may be given 1 as the class number.

According to the above mentioned method, the number of the elements of E(GF(p)) has exactly p with the elliptic curve E, and the order of an element other than the zero element is not prime to p. Therefore, EDLP on such an elliptic curve E can not be solved by the reducing method, hence the privacy communication using such an elliptic curve E is highly secure.

BRIEF DESCRIPTION OF THE DRAWINGS

These and other objects, advantages and features of the invention will become apparent from the following description thereof taken in conjugation with the accompanying drawings which illustrate specific embodiments of the invention. In the drawings:

FIG. 4 is a list showing steps of the privacy communication using PKC through the network of FIG. 3;

FIG. 7 is a list of detailed calculations used in FIG. 6.

DESCRIPTION OF THE PREFERRED EMBODIMENTS

EMBODIMENT I

Figure 1:
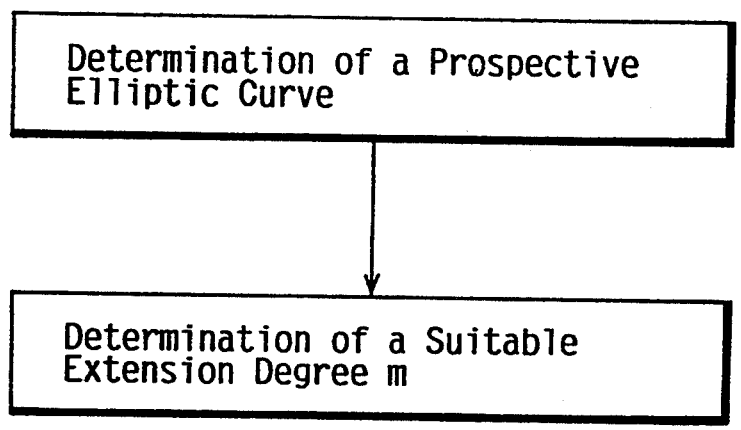
FIG. 1 is a conventional method of constructing an elliptic curve.
Figure 2:
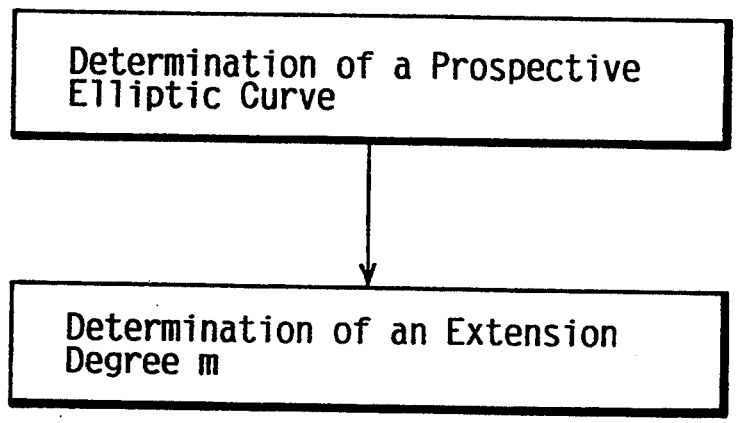
FIG. 2 is another conventional method of constructing an ordinary elliptic curve.
Figure 3:
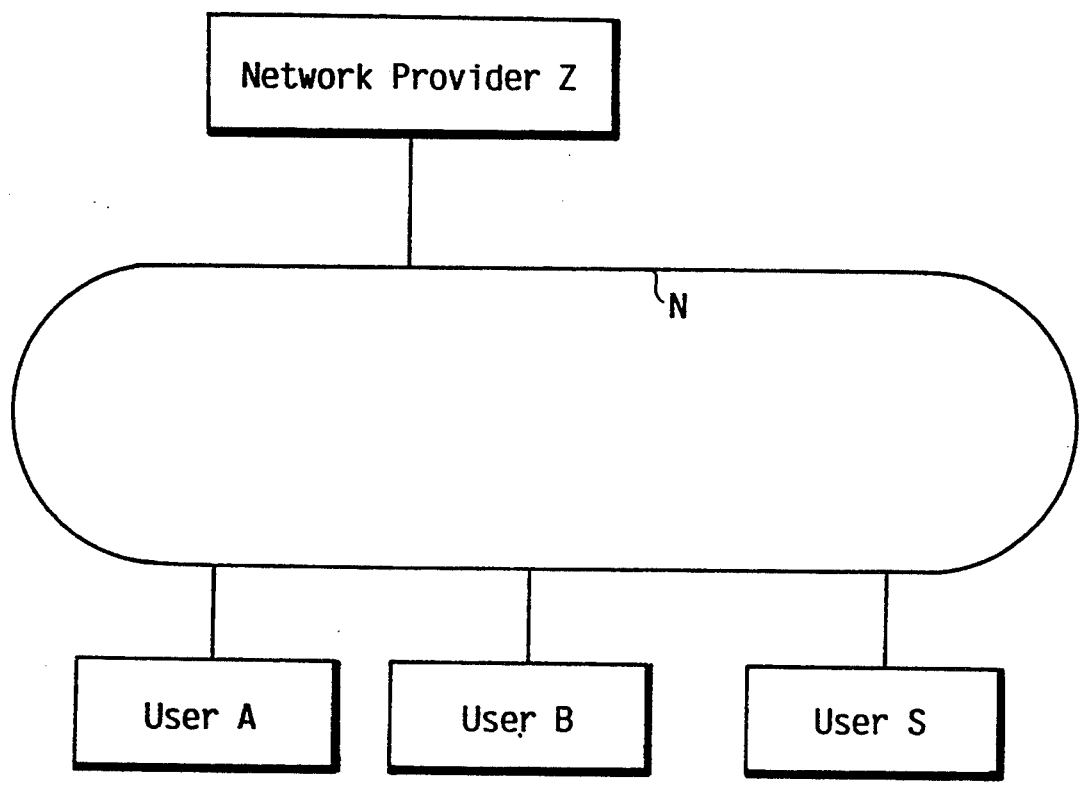
FIG. 3 is a view showing the correlation of users in a privacy communication using the present invention through a network.

As a way of example, PKC using the method of privacy communication of the present invention is described with referring to FIGS. 3 and 4.

As can be seen in FIG. 3, users A and B are two parties who wish to communicate through PKC, a user S is a party who wishes to eavesdrop the communication, and a network provider Z is a party who does initial setting of PKC; all of them are connected to the network N, and take the followings steps summarized in FIG. 4.

In Step 1, the network provider Z calculates an elliptic curve E defined over GF(p) and an element $P_1$ thereof; this process will be discussed more in detail later, for it is the gist of the present invention.

In Step 2, the network provider Z notifies all the users connected to the network N of E(GF(p)) and $P_1$. In Step 3, both users A and B select respective arbitrary integers $x_A$ and $x_B$ in secret as their deciphering keys. In Step 4, the users A and B calculate their public keys $Y_A$ and $Y_B$ on E(GF(p)) using $P_1$: $Y_A = x_A P_1$, $Y_B = x_B P_1$, and notify all the other users of them.

The user A wishing to send a message M(plaintext) to the user B selects a random integer $r_a$ in secret to encipher the message M using $r_a$ and $Y_B$, and sends the enciphered message consisting of $C_1$ and $C_2$ as below to the user B.

$$C_1 = r_a P_1$$

$$C_2 = M + x(r_a Y_b)$$

where $x(r_a Y_B)$ is the X-coordinate of $r_B Y_B$.

Being the element of the elliptic curve E, $r_a Y_B$ is quadratic data expressed as $(r_x, r_y)$ in X-Y coordinate, whereas M is linear data. For this reason, only $r_x$ is used to generate $C_2$ on an agreement made between the users A and B in advance.

Accordingly, the user B deciphers the enciphered message using $x_B$, the key strictly kept to himself, as follows:

$$M = C_2 - x(x_B C_1)$$

where $x(x_B C_1)$ is the X-coordinate of $x_B C_1$.

According to this method, the user A is able to transmit the message M to the user B in secret, and should the user A erroneously transmit the enciphered message to an unintended user, there is no way for him to decipher it, for the deciphering key $x_B$ is kept secret to him.

Figure 5:
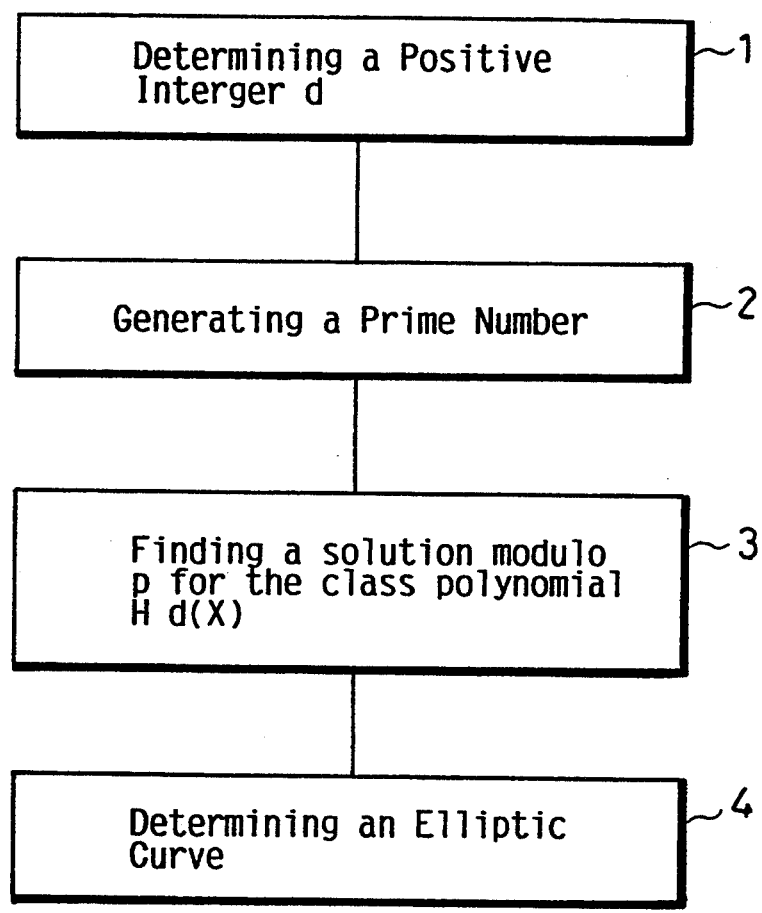
FIG. 5 is a view showing steps of constructing an elliptic curve.

Back to Step 1, how the network provider Z does the initial setting is described. As is shown in FIG. 5, Step 1 consists of 4 sub-steps of:

1) determining a positive integer d;
2) generating a prime number;

3) finding a solution modulo p for the class polynomial $H_d(x)$; and
4) determining an elliptic curve.

These sub-steps are explained more in detail hereunder.

1) Determining a Positive Integer d

Let d be a positive integer such that gives a small class number to an imaginary quadratic field $Q((-d)^{\frac{1}{2}})$. The imaginary quadratic field and class number are described in detail in "VORLESUNGEN UEBER ZAHLEN THEORIE" and "Algebraic Number Theory" S. Lang, GTM110, Springer-Verlag, New York, 1986. For explanation's convenience, let d be 19 and class number be 1; although there are 1, 2, 3, 7, 11, 43, 67 or 163 for d for the class number 1, and for the class number 2, there are 10, 15, 26, 30 or so forth as is described in myriads books on the theory of number for the quadratic fields. However, not all these numbers are applicable to the present invention. For example, when d is 1, 2, or 7, the following step can not be applied.

2) Generating a Prime Number p

Let p be a prime number such that $4 \cdot p - 1 = d \cdot$square number; for this purpose, d must satisfy $d \equiv -1 \pmod 4$ (d = 19 meets this condition). However, as previously mentioned, there exists no prime number such that satisfies $4 \cdot p - 1 = d \cdot$square number when d is 1, 2, or 7.

For example, let p be a 29-digit number of 23520860746468351934891841623, then, $$4 \cdot p - 1 = 19 \cdot (1451 \cdot 48496722383)^2.$$

Given the fact that a prime number of approximately 30-digit can be easily generated, a prime number such that satisfies the above condition can be found relatively easy as well, albeit by trial and error.

3) Finding a Solution Modulo p for the Class Polynomial $H_d(x)$

A solution Modulo p for the class polynomial $H_d(x)$ (d = 19) is found by Fourier series as shown below whose detailed explanation is in "The Arithmetic of Elliptic Curves", J. H. Silberman, Springer-Verlag.

Let $t = \left( \dfrac{1 + \sqrt{19}\, i}{2} \right)$ for $$j(t) = 1/q + 744 + \sum_{n=1}^{\infty} C(n) q^n$$

wherein j(t) is a modular function, C(n) is an integer, and $q = e^{2\pi i t}$ then, $$j\left( \dfrac{1 + \sqrt{19}\, i}{2} \right) = -884736$$

thus, $H_d(x) = x + 884736$ so, a solution modulo p is $x \equiv -884736 \pmod p$ 4) Determining an Elliptic Curve There exist two elliptic curves $E_1$ and $E_2$ defined over GF(p) with a solution of $H_d(x)$ modulo p as a j-invariant modulo GF(p)-isomorphism:

i) $E_1$ for $$a = \dfrac{j}{1728 - j} \pmod p$$

given by $$E_1: y^2 \neq x^3 + 3ax + 2a$$

where j=0,1728 ii) $E_2$ for a non-quadratic residue c that is (c/p)=−1 given by $$E_2: y^2 = x^3 + 3ac^2x + 2ac^3.$$

where j≠0,1728
Then, let j=−884736, thus, $$E_1: y^2 = x^3 + 18569100589317119948598822307x + 99\text{-}03520314302463972586038632$$

$$E_2: y^2 = x^3 + 18569100589317119948598822307x + 13\text{-}617340432165887962305802991$$

From Deu's theorem and Hasse's theorem, #$E_i$(GF(p))(i=1,2) is either p or p+2. Therefore, the elliptic curve to defined EDLP is the one with an element other than the zero element whose order has exactly p. In effect, the base point is fixed to an arbitrary element other than the zero element of $E_i$(GF(p)), for p is the order of an element such that becomes the zero element when multiplied with p.

Thus, in EDLP having the base point other than the zero element of $E_1$(GF(p)), #$E_1$(GF(p)) is not prime to p. Therefore, it can not be solved by the reducing method. As a result, security for PKC which depends on such EDLP is ensured without decreasing the speed of communication.

Figure 6:
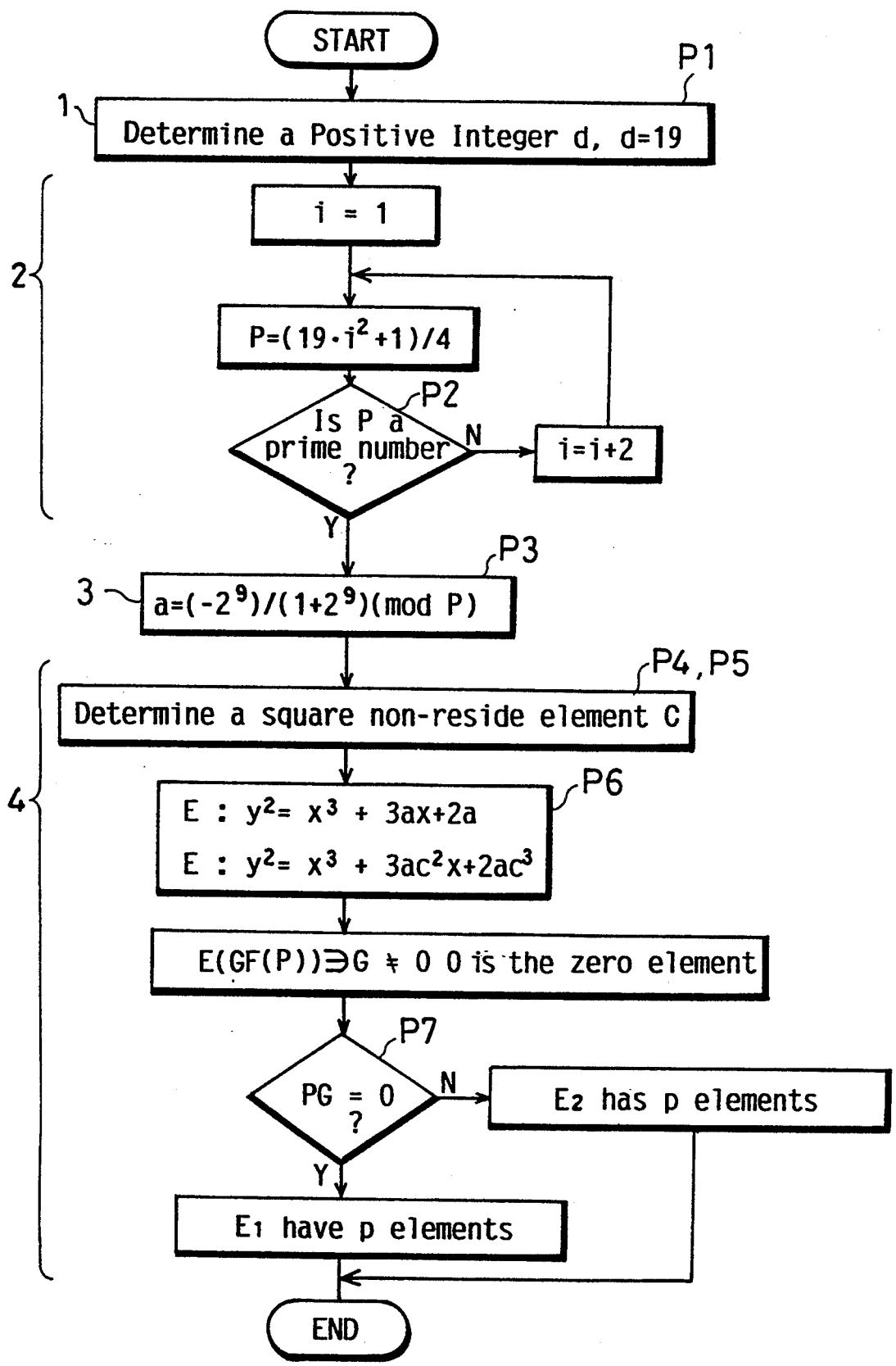
FIG. 6 is a flowchart of FIG. 4 expressed in an algorithm level.

Algorithm based on the above mentioned 4 sub-steps is summarized in the flowchart in FIG. 6; numerals 1-4 in the left show a correspondence with the steps in FIG. 5. In FIG. 7, arithmetic operations for constructing a small elliptic curve as an easy example are shown; P1 through P7 shows a correspondence with the flowchart in FIG. 6. These two correspondences are not identical, for all components are calculated in the latter.

As previously mentioned, there are some positive integers other than 19 for d, and several examples of elliptic curves constructed with such integers are the given in following:

A) Let d be 11 and a prime number p be p=1000000000000069784500614201619 then, $$4p-1 = 11 \cdot 1906925178491852$$

thus, $$H_{11}(x) = x + (2^5)^3$$

then $$x = -(2^5)^3$$

therefore, $$E_1: y^2 = x^3 + 64658219202538723546673861491x +$$

$$6171902951948093571605785264$$

$$P_1 = (0,68651835839797874780406584328)$$

$$E_2: y^2 = x^3 + 44235072938757883609925867087x +$$

$$80526472517872361492194455488$$

$$P_2 = (16697588126171207059471759083,$$

$$50558135212291882814045164247)$$

Then, whether the respective orders of elements other than the zero element of $E_1$ and $E_2$ have exactly p is checked by a calculation, and in this case, it is found that $E_1$ is the elliptic curve with p elements.

B) Let d be 43 and a prime number p be p=1000000000000067553784390207169 then, $$4p-1 = 43 \cdot 96448564434115^2$$

thus, $$H_{43}(x) = x + (2^{6 \cdot 3 \cdot 5})^3$$

then, $$x = -(2^{6 \cdot 3 \cdot 5})^3$$

therefore, $$E_1: y^2 = x^3 + 24557754467536921757954818421x +$$

$$40410589573449782367660219353$$

$$P_1 = (26585494950223134888454565943,$$

$$31209183043559574170523404221)$$

$$E_2: y^2 = x^3 + 69866461751524010602318419904x +$$

$$17027175709313123626175488922$$

$$P_2 = (0,22374848214481414259811678518)$$

Then, whether the respective orders of elements other than the zero element of $E_1$ and $E_2$ have exactly p is checked by a calculation, and in this case, it is found that $E_1$ is the elliptic curve with p elements.

C) Let d be 67 and a prime number p be p=100000000000003991490656290257 then, $$4p-1 = 67 \cdot 77266740928641^2$$

thus, $$H_{67}(x) = x + (2^{5 \cdot 3 \cdot 5 \cdot 11})^3$$

then, $$x = -(2^{5 \cdot 3 \cdot 5 \cdot 11})^3$$

therefore, $$E_1: y^2 = x^3 + 9802217915287010094180357754x +$$

$$86872543342359746381224718825$$

$$P_1 = (87207836128793306663103094884,$$

$$62397242280665662684542866784)$$

$$E_2: y^2 = x^3 + 40646160753795093333095479225x +$$

$$64440828019096112476624894792$$

$$P_2 = (0,23587158762484987674589379428)$$

Then, whether the respective orders of elements other than zero element of $E_1$ and $E_2$ have exactly p is checked by a calculation, and in this case, it is found that $E_2$ is the elliptic curve with p elements.

D) Let d be 163 and a prime number p be p=1000000000000888501978955285771 then, $$4p-1 = 163 \cdot 49537740461829^2$$

thus, $$H_{163}(x) = x + (2^{6} \cdot 3 \cdot 5 \cdot 23 \cdot 29)^3$$

then, $$x = -(2^{6} \cdot 3 \cdot 5 \cdot 23 \cdot 29)^3$$

therefore, $$E_1: y^2 = x^3 + 695398375530858856440294440781x +$$
$$2180210293625934234791 1085254$$

$$P_1 = (0, 1297193870519170835 1900354586)$$

$$E_2: y^2 = x^3 + 435316280575131977823922759x +$$
$$6358773655777869703 1371252331$$

$$P_2 = (27229586870506933835795892372,$$
$$77021584172673696606 19109104)$$

Then, whether the respective orders of elements other than the zero element of $E_1$ and $E_2$ have exactly p is checked by a calculation, and in this case, it is found that $E_2$ is the elliptic curve with p elements.

It is to be noted that the elliptic curves constructed as above are used for strictly confidential messages such as banks' data transmitted throughout the nation. However, not all the messages transmitted through privacy communication are strictly confidential, and for these less confidential messages, the network provider Z may construct elliptic curves with a small prime number by two following sub-steps of:

1) checking whether $\#E_i(GF(p))$ (i is an arbitrary number) has exactly p for any elliptic curve $E_i$ given by $E_i: y^2 = x^3 + ax + b$ (a, b are random numbers and p is a given prime number).
2) constructing an elliptic curve by finding a solution modulo p for the class polynomial $H_r(x)$ to find a j-invariant when p such that $4 \cdot p - 1 = r \cdot b$ (r, b are natural numbers) is found.

This method requires a massive volume of arithmetic operations, but today's most advanced computers can construct the appropriate elliptic curves when p is a small prime number.

Although the present invention was applied to PKC as an example of the privacy communication, it is needless to say that the present invention can be applied to non-public key cryptosystems.

EMBODIMENT II

In this embodiment, the present invention is applied to electric signature: the user A wishing to transmit a message to the user B does so by way of the user C, a third party who plays the role of the network provider Z in Embodiment I.

To begin with, the user C calculates two elliptic curves $E_1$ and $E_2$ given as below in the same manner of Embodiment I:

$$E_1: y^2 = x^3 + 185691005893171199485988223 07x + 99 - 035203143024639725860386 32$$

$$E_2: y^2 = x^3 + 185691005893171199485988223 07x + 13 - 617340432165887962305 02991$$

The user C selects a base point $P_A$ and a base point $P_B$; the former is an element other than the zero element of $E_1(GF(p))$, and the latter is that of $E_2(GF(p))$. Then, the user C notifies the user A alone of $E_1$ and the base point $P_A$, and the user B alone of $E_2$ and the base point $P_B$.

In the mean time, the user A selects an arbitrary integer $x_A$ in secret and generates $Y_A$, i.e. his identity data to the user C, defined by $$Y_A = x_A P_A$$

Subsequently, the user C selects an arbitrary integer $x_{AC}$ in secret and generates $Y_{AC}$, i.e. his identity data to the user A, defined by $$Y_{AC} = x_{AC} P_A$$

Then, the users A and C exchange $Y_A$ and $Y_{AC}$ to make a common key $K_{AC}$ defined by $$K_{AC} = x_A Y_{AC} = x_{AC} Y_A.$$

The user A enciphers the message M using the common key as an enciphering key and transmits the enciphered message to the user C alone, whereas the user C deciphers the enciphered message using the common key as a deciphering key. In general, the message is enciphered/deciphered by a block cipher method such as DES(Data Encryption Standard), but this can be done with Exclusive-OR of the common key as well.

On the other hand, the user B selects an arbitrary integer $x_B$ in secret, and generates $Y_B$, i.e. his identity data to the user C, defined by $$Y_B = x_B P_B$$

Subsequently, the user C selects an arbitrary integer $x_{BC}$ in secret, and generates $Y_{BC}$, his i.e. identity data to the user B, defined by $$Y_{BC} = x_{BC} P_B$$

Then, the users B and C exchange $Y_B$ and $Y_{BC}$ to make a common key $K_{BC}$ defined by $$K_{BC} = x_{BC} Y_B = x_B Y_{BC}.$$

The user C enciphers the message M received from the user A using the common key as an enciphering key and transmits the enciphered message to the user B alone, whereas the user B deciphers the enciphered message using the common key as a deciphering key. The message is enciphered/deciphered by the block cipher method in general, but this can be done with Exclusive-NOR as well. Thus, the message M is transmitted in secret from the user A to the User B by way of the User C.

Different elliptic curves are used in the communication between the users A and C, and between the users B and C to prevent the user B from receiving the communication between the users A and C by any chance, and vice versa.

Also, it would be better to use different calculation methods in the communication between the users A and B, and between the user B and C to increase security against a transmission failure by the user C.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A method of applying a public key encryption network system to users from a provider by using an elliptic curve, comprising the steps of:

supplying on the network system, public data to each of the users from the provider;

selecting a first privacy key at a terminal of a first user and selecting a second privacy key at a terminal of a second user wherein the first and second privacy keys are different;

notifying a number calculated with the public data and the first privacy key to the second user from the first user, and notifying a number calculated with the public data and the second privacy key to the first user from the second user;

generating a random number at the site of one of the first and second users who wishes to transmit a message and subsequently ciphering the random number with the public data;

ciphering the message to be transmitted at the site of one of the first and second users who wishes to transmit the message by using the random number and the number notified from the other user;

transmitting the ciphered random number and the ciphered message from the site of one of the first and second users who wishes to transmit the message to the other user; and deciphering the ciphered message using the privacy key and the ciphered random number at the site of the other user;

wherein the step of supplying public data includes the steps of:

choosing d as a positive integer such that it gives an imaginary quadratic field $Q((-d)^{\frac{1}{2}})$ with a small class number;

choosing p as a prime number such that $4 \cdot p - 1 = d \cdot$square number, so that an elliptic curve E having GF(p) as a field of definition will have a j-invariant as a solution modulo p for a class polynomial $H_d(x) = 0$ which is determined by d;

choosing an elliptic curve E over GF(p) having exact p elements;

choosing an element other than the zero element of E(GF(P)) as a base point; and supplying each user with the elliptic curve E (GF(p)) and the base point.

2. The method of claim 1, wherein 1 is a class number for the imaginary quadratic field $Q((-d)^{\frac{1}{2}})$.

3. The method of applying a public key encryption network system to users from a provider by using an elliptic curve, comprising the steps of:

supplying, on the network system, public data to each of the users from the provider;

selecting a first privacy key at a terminal of a first user, selecting a second privacy key at a terminal of a second user, and selecting a third privacy key at a terminal of a third user wherein the first, second and third privacy keys are different;

notifying a number calculated with the public data and the first privacy key to the third user from the first user, and notifying a number calculated with the public data and the third privacy key to the first user from the third user;

calculating a first common key by using the first privacy key and the number from the third user at the site of the first user, and calculating the first common key by using the third privacy key and the number from the first user at the site of the third user;

notifying a number calculated with the public data and the second privacy key to the third user from the second user, and notifying a number calculated with the public data and the third privacy key to the second user from the third user;

calculating a second common key by using the second privacy key and the number from the third user at the site of the second user, and calculating the second common key by using the third privacy key and the number from the second user at the site of the third user;

ciphering a message to be transmitted using the first common key at the site of the first user;

deciphering the ciphered message using the first common key at the site of the third user;

reciphering the message to be transmitted to the second user using the second common key at the site of the third user; and deciphering the ciphered message using the second common key at the site of the second user;

wherein the step of supplying public data includes the steps of:

choosing d as a positive integer such that it gives an imaginary quadratic field $Q((-d)^{\frac{1}{2}})$ with a small class number;

choosing p as a prime number such that $4 \cdot p - 1 = d \cdot$square number, so that an elliptic curve E having GF(p) as a field of definition will have a j-invariant as a solution modulo p for a class polynomial $H_d(x) = 0$ which is determined by d;

choosing an elliptic curve E over GF(p) having exact p elements;

choosing an element other than the zero element of E(GF(p)) as a base point; and supplying each user with the elliptic curve E(GF(p)) and the base point.

4. The method of claim 3, wherein 1 is a class number for the imaginary quadratic field $Q((-d)^{\frac{1}{2}})$.

5. A method of applying a public key encryption network system to users from a provider by using an elliptic curve, comprising the steps of:

supplying, on the network system, public data to each of the users from the provider;

selecting a first privacy key at a terminal of a first user and selecting a second privacy key at a terminal of a second user wherein the first and second privacy keys are different;

notifying a number calculated with the public data and the first privacy key to the second user from the first user, and notifying a number calculated with the public data and the second privacy key to the first user from the second user;

calculating a common key by using the first privacy key and the number from the second user at the site of the first user, and calculating the common key by using the second privacy key and the number from the first user at the site of the second user;

ciphering the message to be transmitted at the site of one of the first and second users who wishes to transmit the message by using the common key;

transmitting the ciphered message from the site of one of the first and second users who wishes to transmit the message to the other user; and deciphering the ciphered message using the common key at the site of the other user;

wherein the step of supplying public data includes the steps of:

choosing d as a positive integer such that it gives an imaginary quadratic field $Q((-d)^{\frac{1}{2}})$ with a small class number choosing p as a prime number such that $4 \cdot p - 1 = d \cdot$ square number, so that an elliptic curve E having GF(p) as a field of definition will have a j-invariant as a solution modulo p for a class polynomial $H_d(x) = 0$ which is determined by d;

choosing an elliptic curve E over GF(p) having exact p elements;

choosing an element other than the zero element of E(GF(p)) as a base point; and supplying each user with the elliptic curve E(GF(p)) and the base point.

6. The method of claim 5, further comprising selecting 1 as the class number.

7. A method of applying a public key encryption network system to users from a provider by using an elliptic curve, comprising the steps of:

initializing the network by having:

(1) the provider (a) determine a positive integer d (b) generate a prime number p, from d (c) find a solution modulo p for a class polynomial $H_d(x)$ (d) determine an elliptic curve whose j-invariant is a solution of $H_d(X)$ modulo p and whose base point P is fixed to an arbitrary element other than a zero element; and (e) communicate information on the elliptic curve and the base point P to all the users;

(2) each user, (f) selects an individual arbitrary integer x and maintains it in confidence;

(g) calculates a public key, Y, from the arbitrary integer and the base point P; and (h) communicates the public key to the other users;

enciphering a message, M, for broadcast over the network by the sending user selecting a random integer, $r_a$, and enciphering the message using $r_a$ and the public key $Y_b$ of the receiving user, such that the enciphered message includes $C_1$ and $C_2$, where:

$$C_1 = r_a P$$

$$C_2 = M + x(r_a Y_b)$$

where $x(r_a Y_b)$ is the x-coordinate of $r_a Y_b$ and $r_a$ is the random integer selected by the sending user;

sending the enciphered message M over the network; and deciphering the message M by the receiving user using the arbitrary integer $x_b$, where:

$$M = C_2 - x(x_b C_1)$$

where $x(x_b C_1)$ is the x-coordinate of $x_b C_1$.

8. A method of applying a public key encryption network system to users from a provider by using an elliptic curve, comprising the steps of:

supplying data on an elliptic curve E(GF(p)) and base point thereof on the network system to each of the users, including constructing a group of elements, E(GF(p)) on the elliptic curve, E, where GF is a Galois Field and p is a prime number, and the number of elements are exactly p, and where base point is an element other than the zero element of E(GF(p)), and providing each user with the data E(GF(p)) and the base point;

selecting a privacy key at each user;

ciphering a message to be transmitted by a user with the privacy key, base point, and a random number;

transmitting the ciphered message over the network system; and deciphering the ciphered message using the privacy key and the random number.

9. The method of claim 15 herein E(GF(p)) is constructed by:

choosing d as a positive integer such that it gives an imaginary quadratic field $Q((-d)^{\frac{1}{2}})$ with a small class number;

choosing p as a prime number such that $4 \cdot p - 1 = d \cdot$ square number, so that an elliptic curve E having GF(p) as a field of definition will have a j-invariant as a solution modulo p for a class polynomial $H_d(x) = 0$ which is determined by d;

choosing an elliptic curve E over GF(p) having exact p elements; and choosing an element other than the zero element of E(GF(p)) as a base point.

10. The method of claim 9, further comprising selecting 1 as the class number.

11. A method of applying a public key encryption network system to users from a provider by using an elliptic curve, comprising the steps of:

initializing the network by having:

(1) the provider (a) determine a positive integer, d;

(b) generate a prime number, p, from d;

(c) find a solution modulo, p, for a class polynomial $H_d(x)$;

(d) determine an elliptic curve whose j-invariant is modulo p and whose base point P is fixed to an arbitrary element other than a zero element; and (e) communicate information on the elliptic curve and the base point P to all the users;

(2) each user (f) selects an individual arbitrary integer x and maintains it in confidence;

(g) calculates a public key, Y, from the arbitrary integer and the base point P; and (h) communicates the public key to the other users;

enciphering a message, M, for broadcast over the network by the sending user selecting a random integer, $r_a$, and enciphering the message using $r_a$ and the public key $Y_b$ of the receiving user, such that the enciphered message includes $C_1$ and $C_2$, where:

$$C_1 = r_a P$$

$$C_2 = M + y(r_a Y_b)$$

where $y(r_a Y_b)$ is the y-coordinate of $r_a y_b$ and $r_a$ is the random integer selected by the sending user;

sending the enciphered message M over the network; and deciphering the message M by the receiving user using the arbitrary integer $x_b$, where:

$$M = C_2 - y(x_b C_1)$$

where $y(x_b C_1)$ is the y-coordinate of $x_b C_1$.

12. A method of applying a public key encryption network system to users from a provider by using an elliptic curve, comprising the steps of:

initializing the network by having:
  (1) the provider
   (a) determining a positive integer, d;
   (b) generate a prime number, p, from d;
   (c) find a solution modulo, p, for a class polynomial $H_d(x)$;
   (d) determine an elliptic curve whose j-invariant is modulo p and whose base point P is fixed to an arbitrary element other than a zero element; and
   (e) communicate information on the elliptic curve and the base point P to all the users;
  (2) each user
   (f) selects an individual arbitrary integer x and maintains it in confidence;
   (g) calculates a public key, Y, from the arbitrary integer and the base point P; and
   (h) communicates the public key to the other users;

enciphering a message, M, for broadcast over the network by the sending user selecting a random integer, $r_a$, and enciphering the message using $r_a$ and the public key $Y_b$ of the receiving user, such that the enciphered message includes $C_1$ and $C_2$, where:

$$C_1 = r_a P$$

$$C_2 M + f(r_a Y_b)$$

where $f(r_a Y_b)$ is the function for the linear data of $r_a Y_b$ and $r_a$ is the random integer selected by the sending user;

sending the enciphered message, M, over the network; and deciphering the message, M, by the receiver user using the arbitrary integer $x_b$, where:

$$M = C_2 - f(x_b C_1)$$

where $f(x_b C_1)$ is the function of the linear data of $x_b C_1$.

\* \* \* \* \*